United States Patent [19]
Quataert et al.

[11] Patent Number: 5,280,696
[45] Date of Patent: Jan. 25, 1994

[54] METHOD AND APPARATUS FOR CONDITIONING STALK-CONTAINING CROP

[75] Inventors: Petrus-Maria Quataert, Nuenen; Seerp Venhuizen, Somaren, both of Netherlands

[73] Assignee: Greenland Geldrop B.V., Netherlands

[21] Appl. No.: 856,583

[22] Filed: Mar. 24, 1992

[30] Foreign Application Priority Data

Mar. 28, 1991 [DE] Fed. Rep. of Germany ..... 41103874
Mar. 5, 1992 [EP] European Pat. Off. ........ 92103770.1

[51] Int. Cl.$^5$ ............................................. A01F 12/40
[52] U.S. Cl. ................. 56/16.4; 56/DIG. 1; 56/DIG. 2
[58] Field of Search .............. 56/1, 16.4, DIG. 1, 56/DIG. 2, DIG. 5, 364

[56] References Cited

U.S. PATENT DOCUMENTS

| 2,909,988 | 10/1959 | Carlson . | |
|---|---|---|---|
| 4,446,678 | 5/1984 | Smith | 56/1 |
| 4,528,806 | 7/1985 | Klinner | 56/16.4 |

FOREIGN PATENT DOCUMENTS

086458 8/1983 European Pat. Off. .
154128 9/1985 European Pat. Off. .
205206 12/1986 European Pat. Off. .

*Primary Examiner*—Terry L. Melius
*Attorney, Agent, or Firm*—Laff, Whitesel, Conte & Saret

[57] ABSTRACT

In a method of conditioning crop which is continuously processed by means of movable tools of at least one driven tool carrier, the components of the crop are introduced into spaces between the movable tools of the same tool carrier before at least the stalks are squeezed by the tools by narrowing the interspaces, and the components are subsequently discharged by increasing the interspaces again. In the apparatus for carrying out the method, tools (W) are elongated and shaped in the form of rods, fingers or bristles and are arranged on tool carrier (T) with interspaces (Z) approximately in parallel with each other and at a predetermined adjusted density (G1) at which transverse distances (a1) of at least stalk thickness (d) exist between adjacent tools (W). Furthermore, means are provided for introducing components (B) of crop (E) into interspaces (Z), and, finally, there is provided a mechanical device for at least temporarily increasing the adjusted density of tools (W) in a direction transverse to the longitudinal direction thereof to a degree at which spacings (a2) between the tools are smaller than stalk thickness (d).

21 Claims, 7 Drawing Sheets

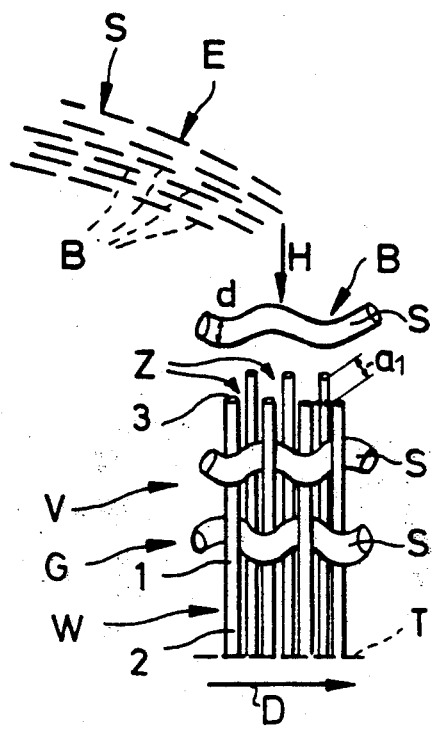 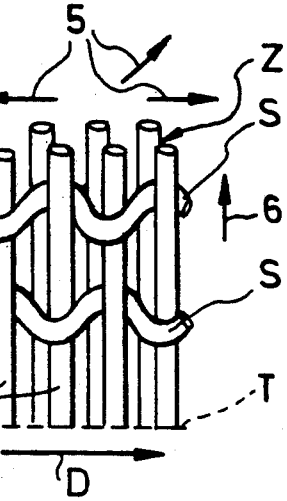
FIG.1a  FIG.2a  FIG.3a
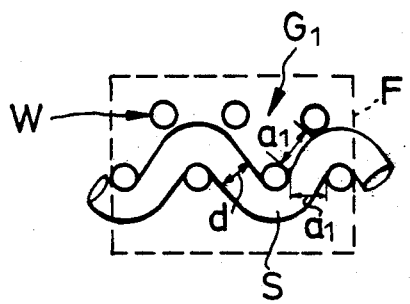 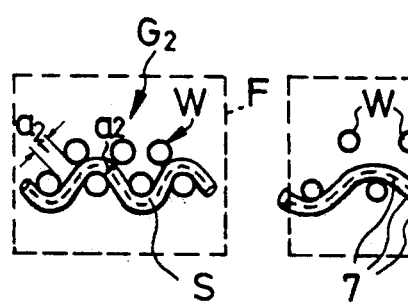 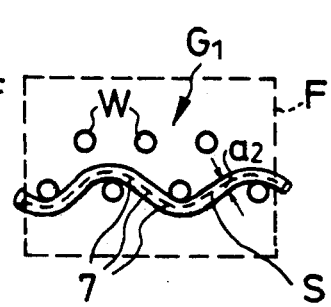
FIG.1b  FIG.2b  FIG.3b
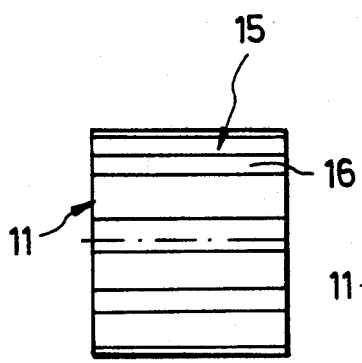 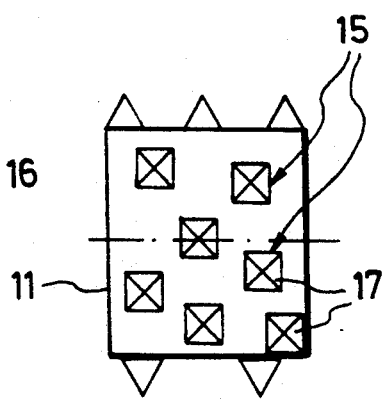 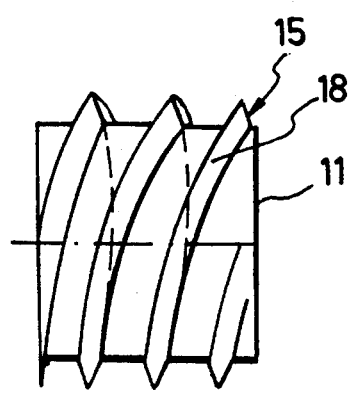
FIG.5  FIG.6  FIG.7

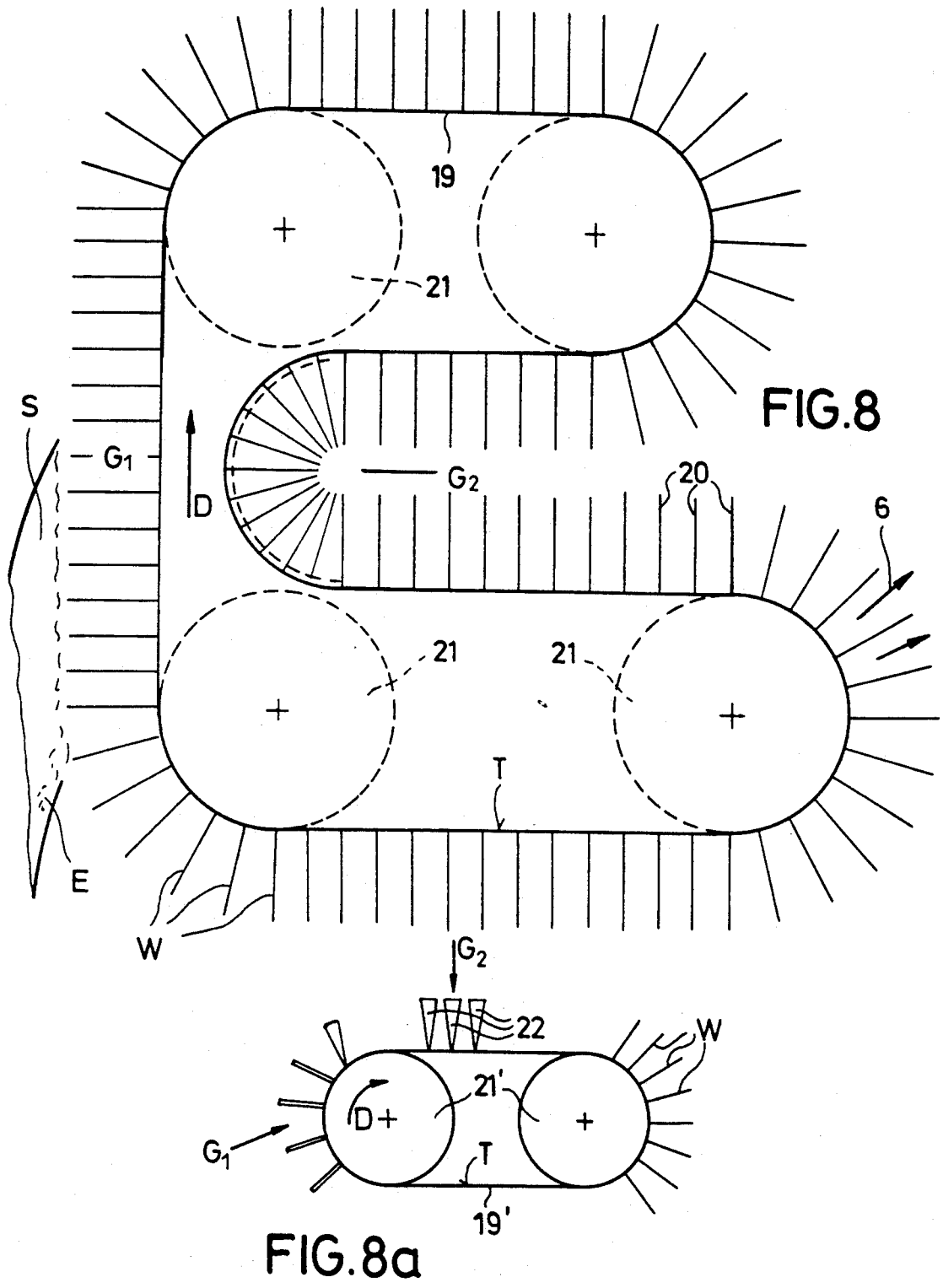

METHOD AND APPARATUS FOR CONDITIONING STALK-CONTAINING CROP

DESCRIPTION

This invention relates to a method of and apparatus for conditioning stalk-containing crop. More particularly, this invention provides a method of and apparatus for squeezing the stalks in a squeezing zone without substantial abrasion until the stalks are ruptured in a longitudinal direction.

When crop, such as grass or alfalfa, is conditioned for producing forage, the outer wax layers must be treated and the cell walls on the surface must be opened so that cell water can flow out and the crop can dry evenly and rapidly. Normally, mown crop is present in the form of a swath in which the components are perhaps already oriented due to mowing. In contrast to the thin and soft leaf parts, the stalks are relatively rigid. They contain a considerable amount of water; the surface is relatively hard; their longitudinal structure is pronouned. For an even and efficient conditioning effect, the stalks, in particular, must be processed intensively. This, however, is not to affect their longitudinal structure, if possible. This goal is reached in theory, i.e. in laboratory tests, when the components are passed through the nip of two smooth, but hard rollers, with the nip being smaller than stalk thickness. In such a case, the stalks burst open in the longitudinal direction, so that water can flow out over the entire stalk length. As far as the leaf parts are concerned, only small mechanical stresses are required for achieving a satisfactory conditioning effect. The longitudinal structure is maintained in the stalks and the leaf parts. In practice, however, this painstaking conditioning process cannot be employed in a field.

General information about conditioning is given in an article by Wieneke & Dernedde, published in "Grundlagen der Landtechnik", Vol. 15 (1965), 3, 65-70.

Different conditioning methods are known from U.S. Pat. No. 4,446,678, EP-A-0 154 128, EP-A-0 205 206 and U.S. Pat. No. 2,909,988.

A method which is known from EP-A1-00 86 458 employs brush rollers which continuously treat the crop swath with the tips of the resilient bristles and at relatively high speeds. Combs or counter-brushes which are stationarily arranged relative to the rotating brush rollers and their bristles have a spiking or scratching effect by which the leaf parts are subjected to a harsh treatment, whereas the stalks are not sufficiently and certainly not evenly processed. Especially in summer grass, there is a great amount of insufficiently conditioned stalks, which is detrimental to a rapid and uniform drying of the crop. If the treatment is intensified, the proportion of undamaged stalks becomes smaller, but the longitudinal structure of the leaf parts is destroyed to a very considerable extent.

Furthermore, it is known that the crop swath is passed between bending rollers which are driven in the manner of gear wheels without any direct meshing engagement in opposite directions. If the distance between the bending rollers is set too narrow or if the swath to be processed is too thick, the longitudinal structure of the components, i.e. also of part of the stalks, is destroyed, whereas stalks in the interior are left untreated because of the resilience thereof. As for a thin swath, almost all of the stalks are not sufficiently processed.

All methods that are used in practice at the moment have the inherent disadvantage that the stalks are conditioned unevenly, and that although a more intensive treatment increases the amount of conditioned stalks, it destroys the longitudinal structure thereof. The quality of the forage is not satisfactory. Losses due to friability are very high. Energy consumption is unsuitably high.

It is the object of the present invention to provide a method of the above-mentioned type as well as an apparatus for carrying out said method, with the aid of which the crop, i.e. also the stalks, can be uniformly conditioned at a short drying time and high forage quality, with the improved conditioning effect being independent of the swath thickness.

In accordance with the invention, the tips of the tools are now no longer used for conditioning purposes, but mainly the flanks of the tools and their interspaces. First of all, the components are isolated and introduced into the interspaces. Although several stalks may be positioned next to or behind one another in the longitudinal direction of the tools, the stalks are substantially isolated between the tools in the squeezing direction. All stalks are then squeezed from two sides by reducing the size of the interspaces until the stalks burst in the longitudinal direction with substantially diametrically opposed longitudinal ruptures. In this way, the stalks are quite gently, but nevertheless efficiently opened. The leaf parts are also treated without the longitudinal structure thereof being destroyed.

The finished crop is conditioned in an unexpectedly uniform way and dries rapidly, resulting in high-quality forage. The longitudinal structure of the stalks is not destroyed, losses due to friability are small. Since squeezing is carried out during crop flow in a flow phase, swaths of different thicknesses can be processed homogeneously. It must only be ensured that the capacity of the interspaces needed for squeezing is sufficient for maximum swath size. If smaller swaths are processed, this does not affect the uniformity of the conditioning process, as each stalk is nevertheless squeezed.

As for the apparatus of the invention, the interspaces needed for a separate intermediate storage of the individual stalks are created between the tools. Means introduce the components into the interspaces. The mechanical device then increases the density of the tools until the longitudinal flanks of the tools squeeze the crop components and, in particular, the stalks. The first and second densities can be predetermined and matched to an optimum and, nevertheless, gentle conditioning of the respective crop.

The free ends of the tools which were mainly used for conditioning purposes in the past have now a negligible function. At best, they help to isolate the components. When the tools are moved towards one another, the space which is occupied by the stalks becomes smaller in the direction of movement of the tools until the cylindrical stalks are squeezed into a flat form and burst along the edges of the flat cross-section in longitudinal ruptures. In another embodiment of the method, the crop flow or swath is disintegrated by introducing its components into the interspaces in a direction approximately perpendicular to the direction of flow. It is only then that these components are squeezed in isolated fashion in the direction of flow and/or in a direction transverse to the direction of flow between the longitudinal sides of the tools. The stalks burst with at least two, almost continuous longitudinal ruptures, so that water can easily flow out, and any automatic closing of the ruptures need not be feared. Since the composite swath is disintegrated, the components are intensively processed.

In another modification of the method, the longitudinal sides or flanks of the tools are used for squeezing purposes at least once and temporarily. As soon as the components have been forced into the interspaces, they are isolated to a substantial degree. The stalks are efficiently squeezed. The leaf parts or leaves are processed without their longitudinal structure being destroyed.

In another modification of the method, the tools are just spaced apart at a distance corresponding approximately to stalk thickness so as to admit the components one by one into the interspaces. The tools are then moved closer to less than stalk thickness for squeezing the stalks. The stalks and other components of the crop are not crushed entirely, but there is only an intended and controlled squeezing operation in which the longitudinal structure of the stalks and leaf parts is maintained and noticeable leaf losses are no longer observed.

In a special embodiment of the method in which the crop is received and processed in the form of a swath, the latter is disintegrated into its components, which results in an intensive and selective individual squeezing of the stalks. The capacity between the tools and/or the rate of motion of the tools in flow direction must be predetermined such that the swath is disintegrated. This will ensure a uniform treatment of all components.

Furthermore, more than one squeezing operation is optionally carried out during one crop flow, and the crop is possibly removed from, and again introduced into, the interspaces between the squeezing operations. This may be expedient with specific crops or under specific working conditions for achieving a uniform conditioning operation. As a rule, a single and intensive squeezing operation is preferred.

Furthermore, it is advantageous when the tool density is increased in the manner of a stationary wave during flow movement on the tool carrier, or when only the respective density in tool groups is changed.

In an expedient embodiment, the resilient bristles effectively squeeze the stalks while they give way to rigid obstacles or foreign manner in the crop. Furthermore, brush rollers are inexpensive and available with any desired adjustments of the bristles (thickness, length, strength, stiffness, etc.). The total volume of the spaces between the bristles is great. If necessary, the brush rollers can be driven at a high circumferential speed. The bristles are resistant to wear, break-proof, not harmful to man and animal, not prone to soiling, self-cleaning and can be provided with any desired cross-section. It is important that, when the density is increased, the bristles squeeze the stalks over a great bristle length. A contour of the bristles without any edges results in great squeezing surfaces.

In an expedient embodiment, the counter-roller which abuts on the free ends of the bristles ensures that all components are forced into the interspaces and that no parts are directly passed therethrough. The displacement elements increase the density of the tools per unit area by penetrating between the bristle groups, whereby the stalks are squeezed. As soon as the displacement elements leave the brush roller, the interspaces between the bristles of the bristle groups become greater again. The processed crop components are removed form the interspaces by centrifual force. Alternatively, or in addition, other measures may be taken for removing the conditioned crop components. The squeezing process for the stalks is here adjustable through the form, the density and the material or through a movable support of the displacement elements on the counter-roller.

The necessary disintegration of the swath and an easy discharge of the treated components must be ensured.

If the brush roller serves as a pick-up device which disintegrates the swath automatically and, lateron, ejects the components again by centrifugal force, the apparatus may be composed of just a few elements.

However, it is also possible to use additional auxiliary devices for disintegrating the crop swath and for removing the processed components from the interspaces between the tools at a later time.

Different speeds, diameters or rotational directions of the cooperating elements help to optimize the conditioning effect. The circumferential speed of the tools is expediently greater than the circumferential speed of the displacement elements.

The method of the invention and embodiments of apparatuses for carrying out the method shall now be explained with reference to the drawing, in which:

FIGS. 1a–1b, 2a–2b and 3a–3b are a perspective section through an apparatus for conditioning crop, each figure illustrating two associated views during different phases of the process;

FIGS. 5, 6, 7 show different variants;

FIG. 8 is a diagrammatic side view of another embodiment;

FIG. 8a shows a variant with respect to FIG. 8;

Figure 4:
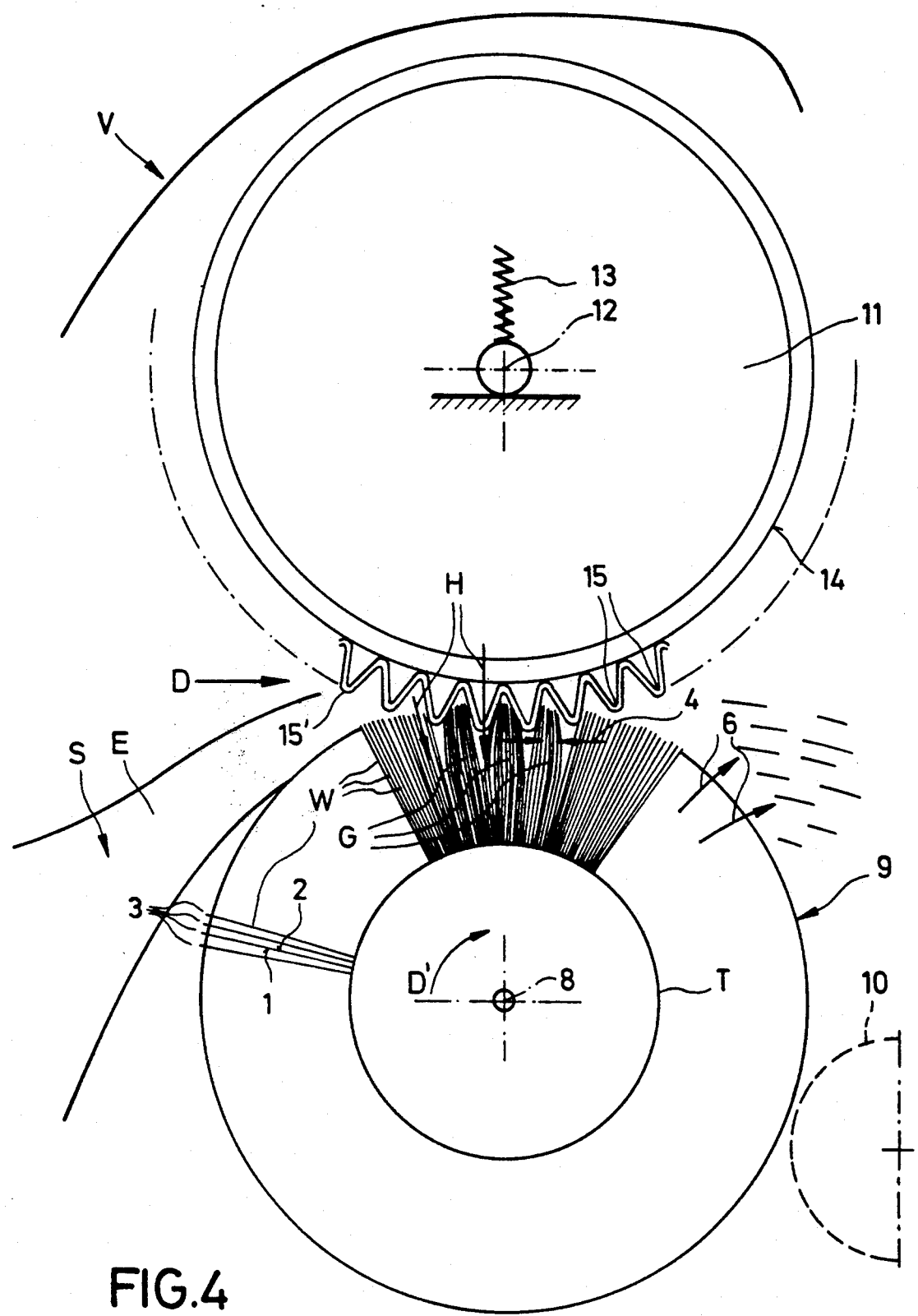
FIG. 4 is a side view, partly in section, of another embodiment of an apparatus.

As illustrated in FIG. 1a, crop E is conditioned in the form of a swath S, which is composed of components B, by means of an apparatus V. Only group G of tools W is shown of apparatus V. This group is movably mounted on a tool carrier T which is driven in the direction of arrow D at a specific speed. Each tool W is formed as an elongate rod, as a finger or as a bristle 1 with a shaft 2 and a free end 3. Tools W are resilient and movable relative to tool carrier T and in a direction approximately transverse to their longitudinal direction. However, it is also possible to mount stiff tools W movably or in articulated fashion on tool carrier T. Tools W are optionally fixed in resilient holding devices either individually or in groups (e.g. FIG. 10).

Spacings a1 exist between tools W as interconnected interspaces Z. The cross section of each tool shank 2 may be round, oval, treefoiled, or the like. The only important thing is that the contour of the cross section has no sharp or outwardly facing corners.

Apart from leaves or leaf parts, firmer stalks S of a known stalk thickness d form components B of crop E. The transverse distances a1 between tools W are, in FIGS. 1a, 1b, only slightly greater than stalk thickness d. This results in a specific density G1 of tools W per unit area F (shown in broken line).

Swath S is disintegrated into its components B for conditioning crop E (FIGS. 1a, 1b). Components B are introduced into interspaces Z in the direction of an arrow H, i.e. in the longitudinal direction of tools W. As for components B, stalks S might lie one above the other between tools W. Stalks S are however isolated in the direction transverse to the longitudinal direction of tools W.

Tools W move constantly in the direction of arrow D. Stalks S need not necessarily wind around tools W as outlined in FIGS. 1a and 1b. They may also lie straight or even be bent or inclined in interspaces Z.

During the further movement of device V, density G1 of tools W is increased in the method according to FIGS. 2a, 2b to a density G2 at which distances a2 between tools W are smaller than stalk thickness d. To this end, tools W move in the direction of arrows 4 towards each other as illustrated in FIG. 2a, namely approximately parallel to flow direction D. The density may also be increased by the tools moving in one direction only, e.g, in the direction of the left arrow 4 in FIG. 2a. Tools W, however, move expediently towards one another from all sides. Interspaces Z become smaller, whereby stalks S are squeezed over their whole length. In FIG. 2a, each stalk can only escape upwards or downwards, so that it is flattened and breaks open at least in two opposite longitudinal ruptures 7 (FIGS. 3b, 3a). During squeezing tool group G continues to move at traveling speed in the direction of arrow D.

In the further course the density is decreased again (FIGS. 3a, 3b) by moving tools W apart from each other in the direction of arrows 5. Interspaces Z reach their original dimensions again or become even greater. In the direction of arrow 6, a force, such as a centrifugal force during rotary movement, acts on the squeezed stalks S and the components to remove the same from interspaces Z.

When the movement of tool group G follows a circular path, tools W are immediately ready again to receive new components. However, it would also be conceivable to increase the density of the same tool group several times and to vary the positions of the components in the interspaces in the meantime. It would also be possible to form other groups of tools, and the crop could be moved from one group to another group in the meantime.

As illustrated in FIG. 4, such a device V is a mobile agricultural machine with wheels 10 which is adapted to be coupled to a tractor or can be integrated into a mowing machine behind the mowing tools. Tools W are bristles 1 of a brush roller 9 which is driven about an axis 8 in the direction of arrow D. Bristles 1 are relatively stiff. Their free ends 3 define a cylinder. The density of bristles 1 is so chosen that interspaces exist between them. In the apparatus, brush roller 9 serves, e.g., as a pick-up roller which picks up swath S from the ground or receives it directly from a mowing device. Brush roller 9 cooperates with a counter-roller 11 which is driven about an axis 12 in a direction opposite to that of brush roller 9. A spring 13 presses counter-roller 11 downwards, so that it possibly rests with its surface 14 on the free ends 3 of bristles 1. Counter-roller 11 may yield upwards in case of excessive pressure, or it may be installed fixedly.

Displacement elements 15 are arranged on counter-roller 11 such that they are distributed over surface 14 thereof in circumferential direction. During crop flow movement D, components B of swath S are introduced into the interspaces between bristles 1 before displacement elements 15 penetrate between bristle groups G and deform each bristle group G in the direction of arows 4 (see FIG. 2a) such that the density is increased and the components, in particular stalks S, are squeezed between the bristles. After displacement elements 15 have been removed, the squeezed components are discharged by centrifugal force in the direction of arrows 6. Surface 14 of counter-roller 11 might also be discontinuous between displacement elements 15.

As illustrated in FIG. 5, displacement elements 15 could be longitudinally extending ribs 16, webs or tubes. As illustrated in FIG. 6, they could also be isolated pyramids, pins or rounded projections 17. Furthermore, as illustrated in FIG. 7, it is possible to use threaded ribs or webs 18 as displacement elements 15. The circumferential speed of counter-roller 11 may be the same as the circumferential speed of brush roller 9. However, it is also possible to operate the two rollers at different speeds. The directions of rotation could also be in the same sense. Brush roller 9 may operate as an undershot or overshot roller or may be arranged at the bottom or top. Displacement elements 15 may be distributed in circumferential direction at irregular intervals. Furthermore, it is also possible to assign more than one counter-roller 11 to brush roller 9 or to provide a disintegrating roller at the inlet side for disintegrating the swath into its components and for introducing the components into the interspaces between the bristles.

Figure 7A:
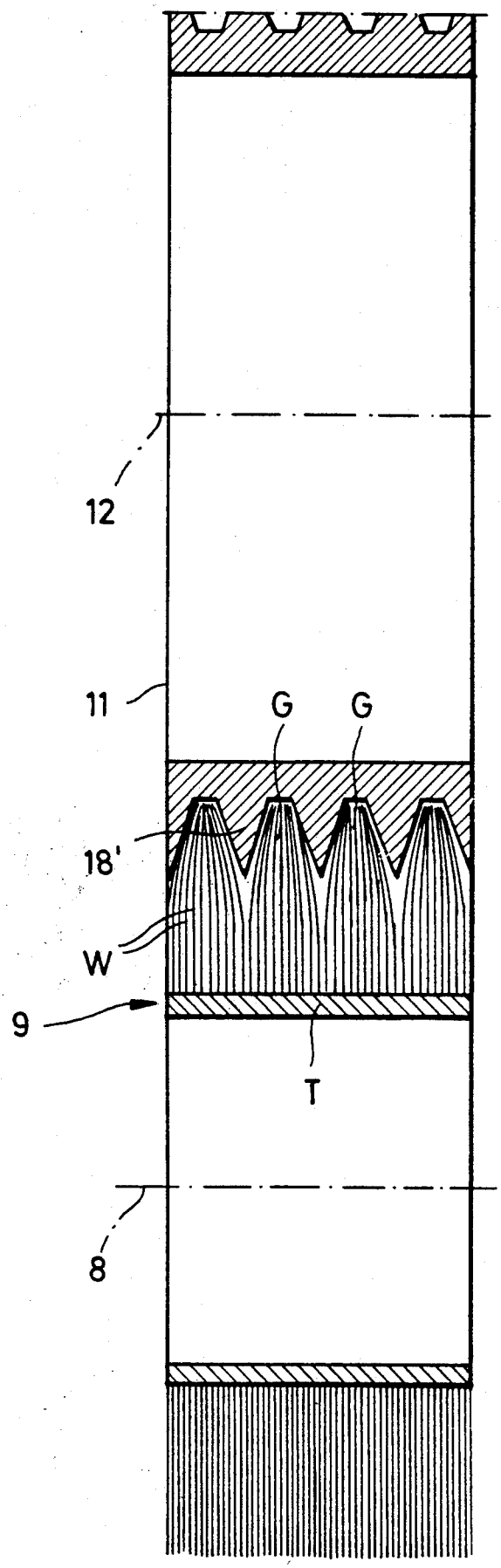
FIGS. 7a, 7b show a variant with respect to FIG. 7.
Figure 7B:
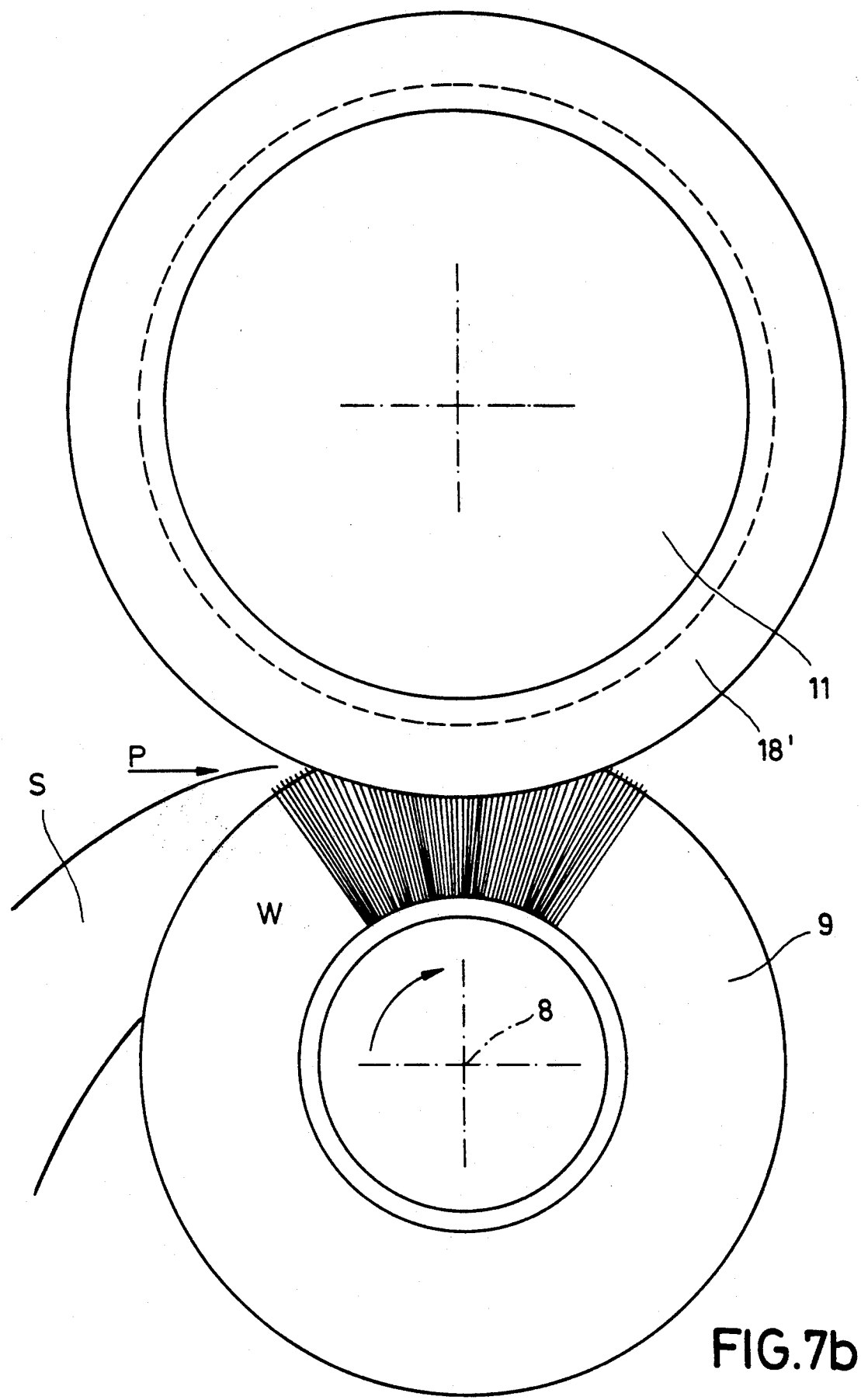

In the embodiment of FIGS. 7a, 7b, the displacement elements are ribs 18' which extend approximately in circumferential direction. Approximately is to mean that they extend either exactly in the circumferential direction and in parallel with each other, or they are undulated or obliquely controlled, but coherent ribs 18'.

Figure 10:
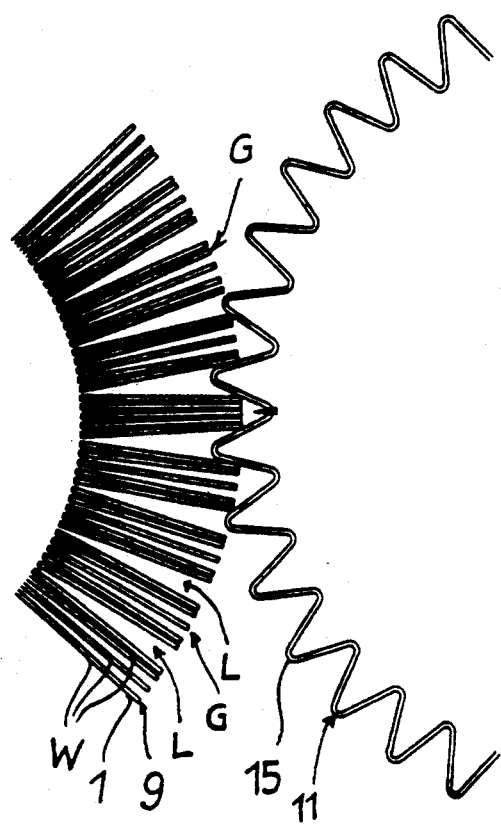
FIG. 10 shows a section through another embodiment.

In the embodiment of FIG. 10, preformed, wedge-shaped gaps L with which the displacement elements 15 of counter-roller 11 are aligned are provided between groups G of tools W (bristles 1 or brush roller 9) which succeed each other at regular intervals in circumferential direction. Bristle wear and the necessary drive power are thereby reduced. The crop is first pressed against brush roller 9 and into the interspaces between bristles 1, and it is only then that the crop is squeezed.

In the embodiment illustrated in FIG. 8, elements 19 which are in the form of a conveyor belt are provided as tool carrier T for tools W. Tools W are rigid prongs or rods or fingers 20 which are arranged at a predetermined density and approximately in parallel with each other. Guide elements 21 serve to guide conveyor belt 19. Crop E is supplied in the form of swath S at a place where tools W have a low density G1, so that components B can pass into the interspaces. In the area where conveyor belt 19 is turned round to travel, e.g., in the opposite direction, the components of crop E are squeezed at a higher density G2 to be later (arrow 6) discharged or removed.

In FIG. 8a, a conveyor belt 19' which is guided around pulleys 21' serves as a tool carrier T. Tools W are, e.g., rods or fingers which are provided on conveyor belt 19' and become e.g. thicker towards the outside. The components are introduced into the interspaces in the area of the low density G1. In the upper horizontal section of conveyor belt 19' which is driven at traveling speed D, the density is increased to G2 and the components are squeezed before they are discharged, with the interspaces being increased again.

Figure 9:
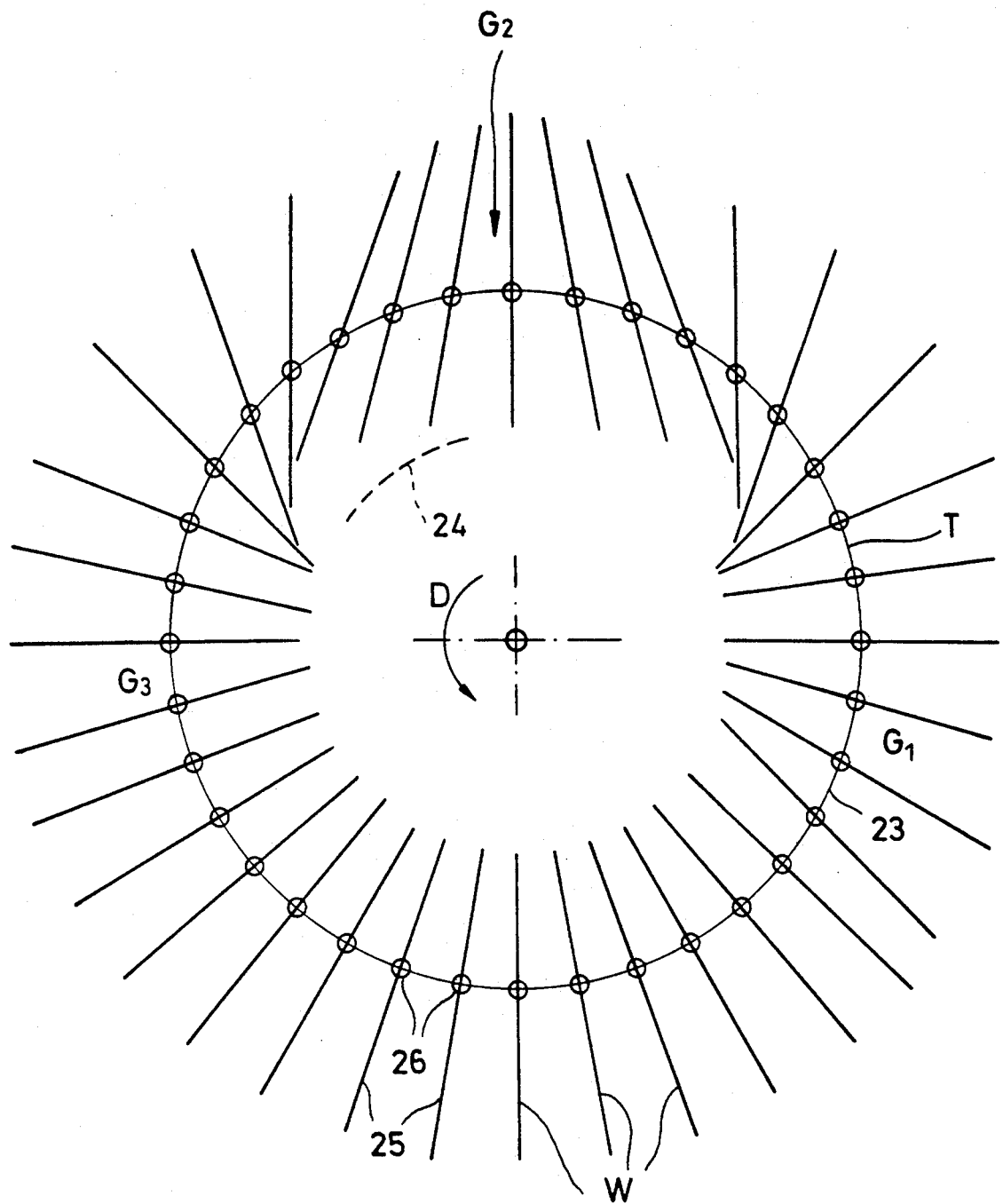
FIG. 9 shows a section through another embodiment.

In the embodiment of FIG. 9, the tool carrier is cylindrically driven at traveling speed D. The tools are fingers or rigid prongs 25 which are pivotably supported in joints 26 on tool carrier T which is formed as a cylinder 23. A mechanical control device 24 (not shown in more detail) controls prongs 25 during each revolution of tool carrier T in such a way that they are present at a low density G1 over part of the circumference, then provided with a higher density G2 at which they squeeze the introduced components, before they are controlled in such a way that there is again a low density G3 at which they discharge the squeezed crop.

We claim:

1. A method of conditioning stalk-containing crop, such as grass or alfalfa, wherein the crop is continuously processed comprising, introducing stalks into a conditioning zone, providing said conditioning zone with conditioning tools, providing a plurality of interspaces formed through said conditioning tools, each of said interspaces providing a receiving zone, a squeezing zone and an ejection zone, introducing said stalks into said interspaces in the receiving zone, squeezing said stalks between adjacent conditioner tools in said squeezing zone without substantial abrasion until the stalks are ruptured in a longitudinal direction, and delivering the ruptured stalks to said ejection zone to discharge said ruptured stalks.

2. A method according to claim 1 said stalks are introduced into said stalk receiving zone interspaces in a direction approximately perpendicular to the direction of flow of said stalks, and that said stalks are squeezed in said squeezing zone in the direction of flow and/or in a direction transverse to said direction of flow between the longitudinal sides of said tools.

3. A method according to claim 2, wherein the spaces of the receiving zone are spaced apart from each other at a thickness corresponding approximately to the thickness of a stalk for obtaining said predetermined density, and that in the squeezing zone transverse distances between adjacent tools are reduced to less than a thickness of said stalk.

4. A method according to claim 1 wherein said crop is received in the form of a swath and continuously processed, introducing component of said swath into the interspaces between the tools of the same tool carrier, squeezing the stalks substantially individually in said squeezing zone by decreasing the interspaces between said tools, and subsequently discharging the stalks after said interspaces have been increased.

5. A method according to claim 4 wherein the stalks are squeezed more than once during one crop flow and discharged and re-introduced again to the squeezing zone operations.

6. A method according to claim 3 wherein the density is continuously increased and decreased during crop flow.

7. A method according to claim 5, wherein the density within groups of squeezing zones is respectively increased and decreased.

8. An apparatus for conditioning stalk-containing crop, such as grass or alfalfa, comprising at least one tool carrier for carrying a plurality of tools, said tool carrier being driven to effect crop flow and processing said crop with the aid of said tools during crop flow, said tools are elongated and shaped in the form of rods, fingers or bristles and are arranged on said tool carrier to define interspaces between adjacent tools, said interspaces being approximately parallel with each other and providing predetermined density at which transverse distances (Q1) of at least stalk thickness (d) exist between adjacent tools (W), means for introducing stalks of said crop into said interspaces between said tools, and means connected to said tools for at least temporarily increasing the density of said tools by movement in a direction transverse to a longitudinal direction of said tools to reduce the transverse distances such that the interspaces are smaller than said thickness of said stalks.

9. An apparatus according to claim 8, wherein said tools are approximately as thick as said stalks of said crop.

10. An apparatus according to claim 8, wherein said tools are resilient bristles of a brush roller and said stalks pass between said bristles and do not contact the ends of said bristles.

11. An apparatus according to claim 8 wherein the flexural strength of said tools is higher than the squeeze resistance of said stalks.

12. An apparatus according to claim 8 wherein the cross section of said tools has a contour without edges.

13. An apparatus according to claim 10, comprising at least one rotating counter-roller, said counter-roller having a plurality of projecting displacement elements, said counter roller positioned to have said displacement elements hold free ends of a group of said bristles of said brush roller and increase the density of said bristles in each group at least temporarily.

14. An apparatus according to claim 13, characterized in that said displacement elements (15) are teeth, ribs, combs, webs, threads, projections or the like of said counter-roller (11) which are optionally movably arranged on said counter-roller (11).

15. An apparatus according to claim 13 wherein the circumferential speed of the free bristle ends is considerably higher than the supply rate of said crop or the operational driving speed of said counter-roller.

16. An apparatus according to claim 10, wherein said brush roller serves as a pick-up device and as a swath disintegrating device, and that the conditioned stalks can be ejected from said interspaces by centrifugal force.

17. An apparatus according to claim 13, wherein at least one swath disintegrating roller is provided in the direction of rotation of said brush roller in front of said counter-roller for introducing the stalks into said interspaces between said bristles of said brush roller.

18. An apparatus according to claim 13 wherein the circumferential speeds of said brush roller and said counter-roller are different, the circumferential speed of said brush roller being preferably higher than the circumferential speed of said counter-roller.

19. An apparatus according to claim 18 wherein said brush roller and said counter-roller rotate in the same direction or in opposite direction within the mutual engagement area.

20. An apparatus according to claim 19 wherein the outer diameters of said brush roller and counter-roller are different.

21. An apparatus according to claim 13 wherein groups of bristles are spaced apart to provide preshaped gaps on said brush roller in a circumferential direction, and said displacement elements are aligned relative to said preshaped gaps.

* * * * *